United States Patent
Wagner et al.

(10) Patent No.: US 11,182,601 B2
(45) Date of Patent: Nov. 23, 2021

(54) SYSTEM FOR RECOGNIZING AN OPERATING INTENTION AT AN OPERATING UNIT THAT CAN BE ACTUATED MANUALLY

(71) Applicant: DEERE & COMPANY, Moline, IL (US)

(72) Inventors: Christoph Wagner, Mannheim (DE); Peter Herrmann, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 12 days.

(21) Appl. No.: 16/816,585

(22) Filed: Mar. 12, 2020

(65) Prior Publication Data
US 2020/0311399 A1    Oct. 1, 2020

(30) Foreign Application Priority Data
Mar. 29, 2019 (DE) .......................... 102019204481.6

(51) Int. Cl.
| | | |
|---|---|---|
| *G06K 9/00* | (2006.01) | |
| *G06N 20/00* | (2019.01) | |
| *A01D 75/28* | (2006.01) | |
| *B60K 26/02* | (2006.01) | |
| *B60R 11/04* | (2006.01) | |
| *B60R 16/023* | (2006.01) | |

(52) U.S. Cl.
CPC ..... *G06K 9/00355* (2013.01); *G06K 9/00832* (2013.01); *G06N 20/00* (2019.01);
(Continued)

(58) Field of Classification Search
CPC .............. B60K 37/06; B60K 2370/146; B60K 2370/1531; B60K 2370/21; B60K 26/02;
(Continued)

(56) References Cited

U.S. PATENT DOCUMENTS

| | | | |
|---|---|---|---|
| 6,948,398 B2 * | 9/2005 | Dybro ................... | E02F 9/2004 172/170 |
| 2005/0134117 A1 * | 6/2005 | Ito ........................... | G06F 3/005 307/10.1 |

(Continued)

FOREIGN PATENT DOCUMENTS

| | | | | |
|---|---|---|---|---|
| DE | 102004038965 A1 * | 3/2005 | ............. | G06F 3/017 |
| DE | 102014214989 A1 | 2/2016 | | |

(Continued)

OTHER PUBLICATIONS

European Search Report issued in counterpart application No. 20163727.9 dated Jul. 1, 2020 (8 pages).

*Primary Examiner* — Robert J Hance

(57) ABSTRACT

A system for recognizing an operating intention at an operating unit that can be actuated manually includes an image capture unit for monitoring a capture region surrounding the operating unit for an entering hand in order to capture it in terms of a positioning of a palm of a hand or of one or a plurality of fingers in relation to the operating unit and to generate corresponding image information. An evaluation unit is provided for comparing the generated image information with at least one image pattern that is characteristic for an operating intention from a pattern memory. In the event of a correspondence that lies within a permitted variation range, a controllable function is enabled on the part of the operating unit.

12 Claims, 1 Drawing Sheet

(52) U.S. Cl.
CPC .............. *A01D 75/28* (2013.01); *B60K 26/02* (2013.01); *B60K 2026/029* (2013.01); *B60R 11/04* (2013.01); *B60R 16/023* (2013.01)

(58) Field of Classification Search
CPC ...... B60K 2026/029; G02B 2027/0138; G02B 2027/014; G06K 9/00832; G06K 9/00355; B60R 1/00; B60R 21/01538; B60R 11/04; B60R 16/023; G06N 20/00; A01D 75/28; G06F 9/453; G06F 3/017
See application file for complete search history.

(56) References Cited

U.S. PATENT DOCUMENTS

| | | | |
|---|---|---|---|
| 2011/0060499 A1* | 3/2011 | Suzuki | G06F 3/017 701/36 |
| 2011/0080490 A1* | 4/2011 | Clarkson | G06T 7/70 348/222.1 |
| 2015/0105939 A1* | 4/2015 | Blaesing | B60W 50/10 701/1 |
| 2016/0349850 A1* | 12/2016 | Tsuda | G06F 3/017 |
| 2017/0323165 A1* | 11/2017 | Haebig | G06K 9/209 |
| 2018/0174457 A1* | 6/2018 | Taylor | G06K 9/00302 |
| 2019/0206253 A1* | 7/2019 | Amano | G08G 1/096791 |

FOREIGN PATENT DOCUMENTS

| | | | | |
|---|---|---|---|---|
| DE | 102015201901 A1 | | 8/2016 | |
| DE | 102017210317 A1 | | 12/2018 | |
| GB | 2286247 A | * | 8/1995 | .............. G01D 5/24 |
| JP | 2628146 B2 | * | 7/1997 | ............ E02F 9/2033 |
| JP | 2005051403 A | * | 2/2005 | .............. B60R 1/00 |
| JP | 2007326491 A | * | 12/2007 | ............. H03K 17/96 |
| WO | WO-2009116285 A1 | * | 9/2009 | ......... G01C 21/3664 |

* cited by examiner

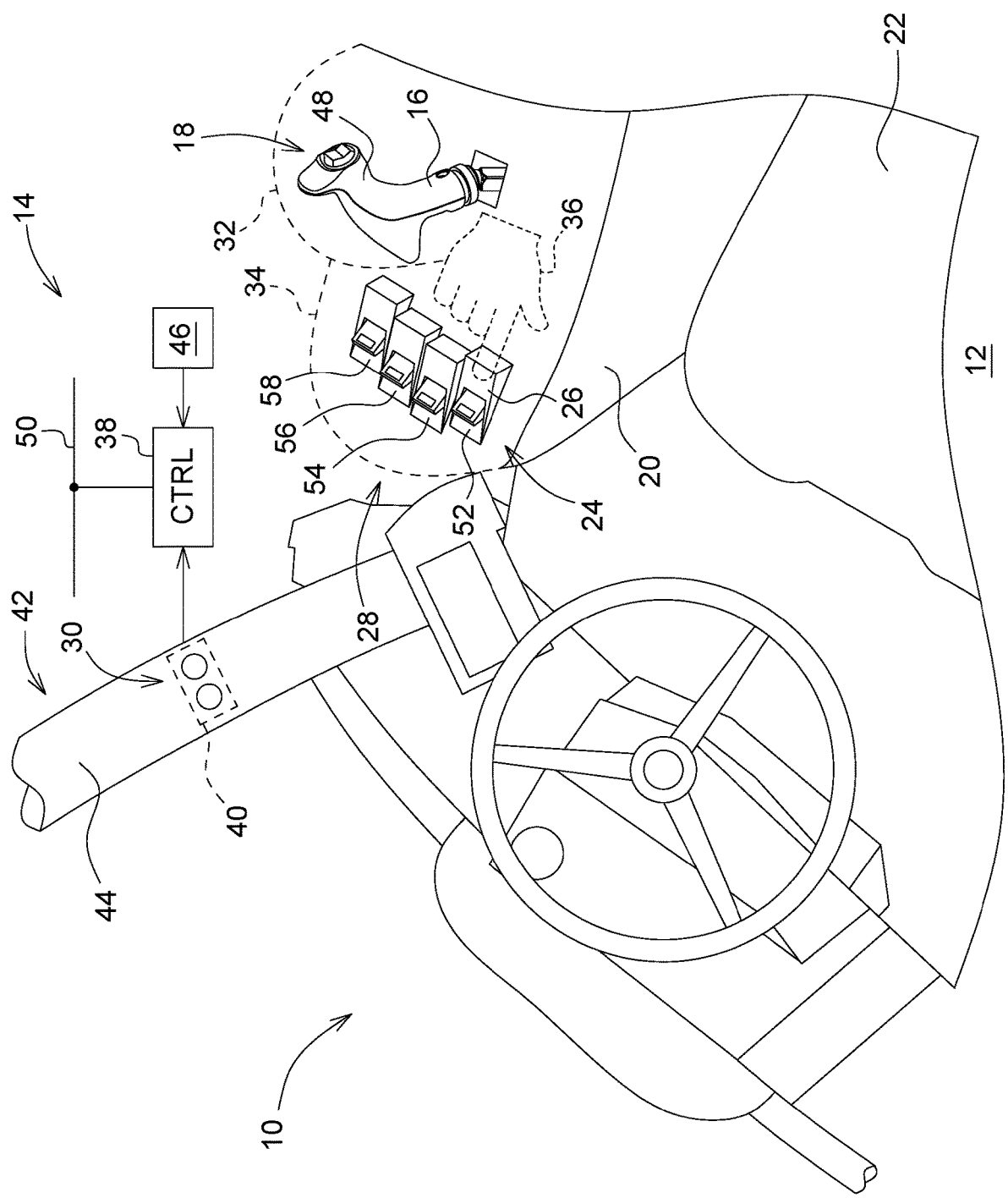

SYSTEM FOR RECOGNIZING AN OPERATING INTENTION AT AN OPERATING UNIT THAT CAN BE ACTUATED MANUALLY

RELATED APPLICATIONS

This application claims priority to German Patent Application Ser. No. 102019204481.6, filed Mar. 29, 2019, the disclosure of which is hereby incorporated by reference in its entirety.

FIELD OF THE DISCLOSURE

The present disclosure relates to a system for recognizing an operating intention at an operating unit that can be actuated manually.

BACKGROUND

A conventional system for recognizing operating intention with a joystick secured against unintended actuations for an agricultural vehicle emerges, for example, from U.S. Pat. No. 6,948,398 B2. The joystick, provided for the operation of various machine or device functions of the agricultural utility vehicle or of accessory equipment located thereon, comprises first and second sensor zones for capacitive touch recognition. The sensor signals provided by the sensor zones are combined with one another by means of a subsequent AND logic circuit in such a way that an operation of the machine or device functions through actuation of the joystick is only enabled when both sensor zones are touched at the same time. The operator must grasp the joystick in a predetermined posture corresponding to the position of the two sensor zones.

The space required for installation of the flat sensor zones has the effect that the design freedom in terms of the shape of the operating lever is subject to certain limits. It is also conceivable that the sensor zones for an application with operating elements that are finger-actuated, and therefore accordingly small in format, are unsuitable.

Thus, there is a need to develop a system that can be used in connection with operating units of arbitrary construction.

SUMMARY

In the present disclosure, a system for recognizing an operating intention at an operating unit that can be actuated manually comprises an image capture unit which monitors a capture region surrounding the operating unit for an entering hand in order to capture it in terms of the positioning of a palm of a hand or of one or a plurality of fingers in relation to the operating unit, and to generate corresponding image information, wherein an evaluation unit compares the generated image information with at least one image pattern that is characteristic for an operating intention from a pattern memory, and in the event of a correspondence that lies within a permitted variation range enables a controllable function on the part of the operating unit.

Since the means or device for recognizing the operating intention is designed to be entirely independent of the operating unit that is to be monitored, it is possible to use the system according to the present disclosure in connection with operating units of arbitrary design.

The image patterns stored in the pattern memory can, for example, be obtained by a "deep learning" approach. In such a case, a manual evaluation or categorization of all conceivable hand and finger positions in respect of an unintentional or intentional actuation of the operating unit concerned takes place first in a learning process. These ultimately define the permitted variation range of the image information for the recognition of an operating intention. The image patterns that are evaluated or categorized in this way are then uploaded to the pattern memory.

In order to be able to assess a spatial positioning of the palm of the hand or of single or multiple fingers in relation to the operating unit reliably, it is advantageous if the image information generated by the image capture unit contains a three-dimensional image of the captured hand.

The image capture unit can here comprise a stereoscopic camera for generating the image information. The stereoscopic camera can be positioned in a driver's cab of a vehicle fitted with the system according to the present disclosure, and installed there in a roof lining or other interior cladding items arranged near to the operating unit.

The operating unit is typically designed as an operating lever in the form of a joystick lying in the capture region of the image capture unit or of an operating element field, which can consist of a large number of individual operating elements, lying in the capture region of the image capture unit.

The enabled function is, in particular, an operating or working function of an all-terrain utility vehicle or of a working device attached thereto. Amongst other things, the use of the system according to the present disclosure in an agricultural tractor to which a front loader is attached, wherein the latter can be controlled manually through an operating lever designed as a joystick, is conceivable. The system here prevents unwanted front loader movements which can occur as a result of an unintentional deflection of the operating lever. The operating unit can, on the other hand, also be designed as an array of toggle switches for the manual operation of a control valve block located in the rear region of the agricultural tractor at which hydraulic consumers of a working device attached to the agricultural tractor can be operated to execute associated working functions.

It should be noted for the sake of completeness that another arbitrary agricultural machine can also be involved in place of the agricultural tractor. It is thus conceivable that, amongst other things, a harvesting machine with an operating unit designed as a control lever is involved, wherein various operating functions of a steering system or drive of the harvesting machine can be controlled through the control lever. A use of the system according to the present disclosure is, equally, not restricted to the agricultural sector, but rather can also be employed in the field of forestry or construction machines, or with forklift trucks or (stationary) loading cranes.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

The FIGURE shows an exemplary embodiment of the system in an all-terrain utility vehicle designed as an agricultural tractor.

Corresponding reference numerals are used to indicate corresponding parts in the FIGURE.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The system 14, housed in a driver's cab 10 of the agricultural tractor 12, comprises a first operating unit 18 designed as an operating lever or joystick 16. The first operating unit 18 is housed in an operating panel 20 at the side in the region of a driver's seat 22, and is used for the manual control of a front loader (not illustrated) attached to the agricultural tractor 12. A second operating unit 24 is designed as an operating element field in the form of an array 26 of toggle switches for the manual operation of a control valve block (not illustrated) located in the rear region of the agricultural tractor 12 at which hydraulic consumers of a working device attached to the agricultural tractor 12 can be operated to execute associated working functions. The second operating unit 24 is arranged here in a front region 28 of the side operating panel 20.

An image capture unit 30 which monitors a capture region 32, 34 respectively surrounding the first and second operating unit 18, 24, is also present. The capture region 32, 34 is shown in the FIGURE by a virtual envelope that extends around the operating unit 18, 24 concerned.

If the image capture unit 30 recognizes a hand 36 entering into the respective capture region 32, 34, it then captures the hand 36 in respect of the positioning of the palm of the hand or of one of a plurality of fingers in relation to the respective operating unit 18, 24, in order to generate corresponding image information that is then passed for the purpose of evaluation to an evaluation unit 38 that communicates with the image capture unit 30.

The image information generated by the image capture unit 30 here contains a three-dimensional image of the captured hand 36. The image capture unit 30 comprises a stereoscopic camera 40 to generate the image information. The stereoscopic camera 40 is also located in the driver's cab 10, and is installed there in a roof lining or in an interior cladding part 44 arranged in the region of an A-column 42.

The evaluation unit 38 compares the generated image information with at least one image pattern from a pattern memory unit 46 that is characteristic of an operating intention of the operating unit 18, 24 concerned, wherein, in the case of a correspondence lying within a permitted variation range, the function that can be controlled by the respective operating unit 18, 24 is enabled over an associated CAN bus 50.

In the case, for example, of the operating lever or joystick 16, the associated front loader function is enabled if a handle piece 48 provided at the operating lever or joystick 16 is located within the palm of the hand, and the fingers also grasp the handle piece 48 in a manner typical of operation. In terms of the array 26 of toggle switches, on the other hand, the associated working functions are enabled when it is found that the palm of the hand is turned downwards in the direction of the operating panel 20, and that one or a plurality of fingertips are located close to one or a plurality of toggle switches 52, 54, 56, 58 or touch them.

The image patterns stored in this respect in the pattern memory unit 46 are obtained by a "deep learning" approach. A manual evaluation or categorization of all conceivable hand and finger positions in respect of an unintentional or intentional actuation of the operating unit 18, 24 concerned takes place first in a learning process. These ultimately define the permitted variation range of the image information for the recognition of an operating intention. The image patterns evaluated or categorized in this way are then uploaded into the pattern memory unit 46.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A system for recognizing an operating intention at an operating unit that can be actuated manually, comprising:
   an image capture unit for monitoring a capture region surrounding the operating unit configured to be engaged by a hand of an operator in order to capture it in terms of a positioning of a palm of the hand or of one or a plurality of fingers in relation to the operating unit and to generate corresponding image information; and
   an evaluation unit for comparing the generated image information with at least one image pattern that is characteristic for an operating intention from a pattern memory;
   wherein, in the event of a correspondence that lies within a permitted variation range, a controllable function is enabled on the part of the operating unit;
   wherein the operating unit is an operating lever in the capture region of the image capture unit, the operating lever manually controls an associated front loader, and the controllable function is an associated front loader function; and
   wherein the associated front loader function is enabled by the evaluation unit when the image capture unit generates an image of an operator's hand positioned in contact with or near the operating lever.

2. The system of claim 1, wherein the image information generated by the image capture unit contains a three-dimensional image of the captured hand.

3. The system of claim 1, wherein the image capture unit comprises a stereoscopic camera for generating the image information.

4. The system of claim 1, wherein the pattern memory operably stores a plurality of image patterns, where each image pattern corresponds to a different intentional or unintentional actuation of the operating unit.

5. The system of claim 1, wherein the evaluation unit is disposed in communication with the operating unit via a CAN bus.

6. The system of claim 1, wherein the associated front loader function is enabled by the evaluation unit when the image capture unit generates an image of the operator's hand grasping the operating lever.

7. The system of claim 1, wherein the image capture unit monitors a second capture region surrounding a second operating unit configured to be engaged by the hand of the operator in order to capture it in terms of a positioning of the palm of the hand or of one or more fingertips in relation to the second operating unit and to generate corresponding image information;

wherein the second operating unit is one or more toggle switches, and the second controllable function is an associated working function of a working device; and wherein the second controllable function is enabled by the evaluation unit when the image capture unit generates an image of the hand of the operator with the palm turned towards the one or more toggle switches and one or more fingertips positioned near the one or more toggle switches.

8. A work machine, comprising:

a chassis including at least an A-column;

an operator's cab including at least a first operating unit for performing a first function and a second operating unit for performing a second function; and a control system for recognizing a manual operating intention of the first or second operating unit, the control system comprising:

an image capture unit positioned within the cab for monitoring a region surrounding the first and second operating units, where the image capture unit is configured to identify and generate an image when an operator reaches towards either the first operating unit or the second operating unit;

a memory unit for storing a plurality of image patterns associated with an operating intention of the first or second operating unit; and an evaluation unit disposed in communication with the image capture unit, the evaluation unit configured to receive the generated image from the image capture unit and compare information from the generated image with at least one image pattern from the memory unit;

wherein, if the information from the generated image corresponds with an operating intention within a permitted variation range, the first or second function is enabled by the evaluation unit;

wherein the first function is enabled by the evaluation unit when the image capture unit generates an image of an operator's hand grasping the first operating unit;

wherein the second function is enabled by the evaluation unit when the image capture unit generates an image of an operator's hand with the palm turned towards the second operating unit and one or more fingertips positioned near the second operating unit;

wherein the first operating unit is an operating lever and the first function is an associated front loader function; and wherein the second operating unit is one or more toggle switches and the second function is an associated working function of a working device attached to the work machine.

9. The work machine of claim 8, wherein the information generated by the image capture unit comprises a three-dimensional image of a hand of the operator in proximity to the first or second operating unit.

10. The work machine of claim 8, wherein the image capture unit comprises a stereoscopic camera for generating the image information.

11. The work machine of claim 10, wherein the image capture unit is located on the A-column of the frame in the operator's cab.

12. The work machine of claim 8, wherein the evaluation unit is disposed in communication with the operating unit via a CAN bus.

* * * * *